United States Patent
Talley et al.

(10) Patent No.: US 9,832,688 B2
(45) Date of Patent: Nov. 28, 2017

(54) INTELLIGENT RE-PROVISIONING OF BASE STATIONS FOR CIRCUIT-SWITCHED FALLBACK

(71) Applicant: Sprint Spectrum L.P., Overland Park, KS (US)

(72) Inventors: Ryan S. Talley, Overland Park, KS (US); Muralidhar R. Malreddy, Overland Park, KS (US); Shilpa Kowdley Srinivas, Brambleton, VA (US); Kyle C. Allen, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 50 days.

(21) Appl. No.: 15/014,953

(22) Filed: Feb. 3, 2016

(65) Prior Publication Data

US 2016/0157137 A1 Jun. 2, 2016

Related U.S. Application Data

(63) Continuation of application No. 13/789,302, filed on Mar. 7, 2013, now Pat. No. 9,288,728.

(51) Int. Cl.
*H04W 36/00* (2009.01)
*H04W 72/04* (2009.01)
*H04W 36/14* (2009.01)

(52) U.S. Cl.
CPC ....... *H04W 36/0022* (2013.01); *H04W 36/14* (2013.01); *H04W 72/0453* (2013.01)

(58) Field of Classification Search
CPC ............ H04W 36/14; H04W 72/0453; H04W 36/0022

See application file for complete search history.

(56) References Cited

U.S. PATENT DOCUMENTS

| 8,107,969 B2 * | 1/2012 | Wu | H04W 16/10 370/329 |
|---|---|---|---|
| 8,270,431 B2 | 9/2012 | Brisebois et al. | |
| 8,285,281 B2 | 10/2012 | Flore et al. | |
| 2009/0264094 A1 | 10/2009 | Smith | |
| 2011/0305192 A1 * | 12/2011 | Faccin | H04W 48/18 370/328 |
| 2012/0028661 A1 * | 2/2012 | Fang | H04W 36/0022 455/466 |

(Continued)

*Primary Examiner* — Qun Shen

(57) ABSTRACT

Embodiments are described that may help to provide wireless service in a circuit-switched fall back scenario. In particular, when a user entity (UE) falls back from a first network to a second network to conduct a voice call, the first network may instruct the UE to scan a certain predetermined channel or channels for coverage from the second network. However, certain types of base stations typically operate on unlisted channels that differ from the predetermined channels that the UE is instructed to scan. Accordingly, a UE may pre-emptively scan unlisted channels, and report any unlisted channel that is detected to the first network. The first network can then coordinate with the second network to re-provision the base station that was operating on an unlisted channel, to instead operate on one of the predetermined channels that a UE will be instructed to scan during fall back to the second network.

20 Claims, 6 Drawing Sheets

(56) References Cited

U.S. PATENT DOCUMENTS

| | | | |
|---|---|---|---|
| 2012/0140644 A1* | 6/2012 | Ngai | H04W 36/0022 370/252 |
| 2013/0034081 A1* | 2/2013 | Ban | H04W 36/16 370/331 |
| 2013/0336157 A1* | 12/2013 | Tidestav | H04L 5/0048 370/252 |
| 2014/0087727 A1 | 3/2014 | Walton | |
| 2016/0007247 A1* | 1/2016 | Lee | H04W 36/0066 370/331 |

* cited by examiner

INTELLIGENT RE-PROVISIONING OF BASE STATIONS FOR CIRCUIT-SWITCHED FALLBACK

CROSS-REFERENCE TO RELATED APPLICATION

This patent application is a continuation of co-owned U.S. application Ser. No. 13/789,302, which was filed on Mar. 7, 2013, the contents of which are entirely incorporated herein by reference, as if fully set forth in this application.

BACKGROUND

To provide cellular wireless communication service, a wireless service provider or "wireless carrier" typically operates a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other wireless communication device (WCD) that is positioned within coverage of the RAN can then communicate with a BTS and in turn, via the BTS, with other served devices or with other entities on the transport network.

Wireless communications between a WCD and a serving BTS in a given coverage area will typically be carried out in accordance with one or more agreed air interface protocols that define a mechanism for wireless exchange of information between the WCD and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), Long-Term Evolution (LTE), TDMA, AMPS, GSM, GPRS, UMTS, or EDGE, and others now known or later developed.

The air interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link, for example, may define (i) access channels on which WCDs may transmit "access probes" such as registration messages and call origination requests, and (ii) traffic channels on which WCDs may transmit bearer traffic for receipt by the RAN.

In a conventional CDMA wireless network compliant with the well-known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code.

When a RAN receives an incoming communication for a WCD, the RAN typically pages the WCD via a paging channel in at least the coverage area in which the WCD last registered. When a cellular wireless communication system seeks to page a WCD (e.g., for an incoming call or for some other reason), a switch in the network may send the page message to numerous base stations in the switch's coverage area, with the hope that when the base stations broadcast the page message, the WCD will receive the page message in one of the associated sectors, and will respond. Further, a switch may be configured to re-send a page in the event that a given attempt to page a WCD fails.

Wireless service providers typically design their wireless networks to comprise a number of partially-overlapping wireless coverage areas. As a WCD that is subscribed to a wireless service provider moves about, the wireless network may hand off the WCD from one wireless coverage area to another. A goal of performing such handoffs is to provide a substantially continuous wireless coverage to the WCD, so that any communication sessions conducted by the WCD are not dropped or degraded due to loss of wireless coverage.

Overview

Disclosed herein are methods and systems that may help to improve the transfer of a wireless communication device (WCD) from a first wireless network to a second wireless network. For instance, example embodiments may be implemented in conjunctions with circuit-switched fallback (CSFB) functionality to help improve service for a voice call when a WCD switch from a Long-Term Evolution (LTE) network to a Code Division Multiple Access (CDMA) network (e.g., a CDMA 1x2000 network) to engage in the voice call via the CDMA network.

Both CSFB and eCSFB functionality may allow a WCD to use a single radio for multiple networks at most times. In particular, a WCD may power off its CDMA radio components at most times, and receive CDMA communications, such as page messages, via the LTE network. The WCD may power on its CDMA radio components when, e.g., it needs to connect to the CDMA network for a voice call. To do so, the LTE network and the CDMA network (e.g., the fall back network) may be connected via a tunnel through the LTE network.

In existing eCSFB systems, when a 3G call (e.g., a call over a CDMA network) is to be set up for a WCD, the base station in the LTE network, which is referred to as an eNodeB, transmits a directive to the WCD to scan for 3G coverage (e.g., CDMA coverage). Under eCSFB, the LTE network may have already provided the WCD with a list of one or more channels that should be scanned. In particular, the list of one or more channels may be provided by the LTE network in a system information message referred to as a SIB8 message. As such, the WCD may scan the one or more channels (e.g., the carrier frequencies) that were indicated by the LTE network. The WCD then reports the channel or channels that were detected to the LTE network, and the LTE network passes this information to the 3G network via an inter-networking function (IWF). The 3G network can then assign a traffic channel for the call and provide a traffic-channel-assignment via the LTE network to the UE.

Under eCSFB, WCDs are typically instructed to scan a macro-network channel or channels, or in other words, a channel or channels that are typically utilized for macro-network base stations. In some cases, an issue may arise when a WCD is in the coverage area of a 3G femtocell, as femtocells are typically provisioned to operate on different channels than those that are assigned to macro-network base stations. In this scenario, the WCD may miss an opportunity to place or receive a voice call through the femtocell, and instead conduct the call via a macro-network base station, even if the femtocell provides better service than the macro-network base station.

Thus, an exemplary method may help an eCSFB-capable WCD to periodically perform a scan for 3G coverage (likely a full scan, including channels that are not indicated by the LTE network in the SIBS message). If and when the WCD detects a 3G base station, such as a femtocell, which is operating on a channel that is not listed in the SIBS message, the WCD will report the unlisted channel to the LTE network. To enable subsequent eCSFB operation, the LTE network will then report the unlisted channel to the 3G network. A femtocell controller or another entity in the 3G network can then provision the base station to operate on one of the channels that the LTE network would include in the list that it sends to the WCD for eCSFB operation.

Advantageously, an exemplary method may help provide eCSFB operation with respect to femtocells and other base stations, without requiring that such a femtocell or base station operate on a macro-network channel on a permanent basis. Instead, a femtocell or other such base station can switch to one of the channels that is indicated by the SIBS message only in scenarios where an eCSFB-capable WCD might miss the opportunity to connect to the femtocell or base station for a 3G voice call.

Herein, WCDs may also be referred to as "mobile stations," as is common when referring to WCDs in the context of a CDMA network, and also as "user entities" (UEs), as is common when referring to WCDs in the context of an LTE network. Thus, the terms "mobile station," "wireless communication device" (or WCD), and "user entity" (or UE) may be used interchangeably herein.

In one aspect, a computer-implemented method involves a UE that is configured to communicate with a first access network under a first protocol and to communicate with a second access network under a second protocol: (a) performing a scan to detect one or more channels that are available for communication under the second protocol, wherein at least a first channel that is available for communication under the second protocol is detected during the scan; (b) determining that the first channel is an unlisted channel that is not included on a predetermined channel list, wherein a first base station in the second access network operates on the first channel; and (c) responsive to determining that the first channel is unlisted, the UE sending, to the first access network, a message that identifies the first channel.

In another aspect, an exemplary wireless communication device includes one or more communication interfaces providing for communications with a first access network under a first protocol and communications with a second access network under a second protocol, a tangible non-transitory computer-readable medium, and program instructions stored in the tangible non-transitory computer-readable medium. The program instructions are executable by at least one processor to: (a) initiate a scan to detect one or more channels that are available for communication under the second protocol, wherein at least a first channel that is available for communication under the second protocol is detected during the scan; (b) responsive to a scan in which at least a first channel that is available for communication under the second protocol is detected, determine that the first channel is an unlisted channel that is not included on a predetermined channel list, wherein a first base station in the second access network operates on the first channel; and (c) responsive to the determination that the first channel is unlisted, send, to the first access network, a message that identifies the first channel.

In yet another aspect, a computer-implemented method involves a first access network that is configured for communications under a first protocol: (a) receiving a first message that indicates one or more detected channels that were detected by a UE during a scan for service under a second protocol, wherein each detected channel is available to the UE for communication with a second access network under the second protocol; (b) determining that at least a first detected channel is an unlisted channel that is not included on a predetermined channel list; and (c) responsively sending a channel-update message to the second access network, wherein the channel-update message indicates to the second access network to re-provision a first base station that operates on the first detected channel to instead operate on a second channel that is included on the predetermined channel list.

In a further aspect, a computer-implemented method involves a second access network that provides service under a second protocol: (a) initially causing a first base station of the second access network to operate on a first channel, wherein the first channel is an unlisted channel is not included on a predetermined channel list; (b) receiving a channel-update message from a first access network, wherein the channel-update message indicates that the second access network should re-provision the first base station to operate on a listed channel that is included on the predetermined channel list; and (c) responsively initiating a process to cause the first base station to operate on a listed channel that is included on the predetermined channel list.

These as well as other aspects, advantages, or alternatives will become apparent to those of ordinary skill in the art by reading the following detailed description, with reference where appropriate to the accompanying drawings. Further, it should be understood that the description provided by this overview section and elsewhere in this document is intended to explain and illustrate the invention by way of example only.

DETAILED DESCRIPTION

Exemplary embodiments are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of exemplary systems and methods can be arranged and combined in a wide variety of different configurations, all of which are contemplated herein.

I. EXAMPLE COMMUNICATION SYSTEM ARCHITECTURE

In an exemplary configuration, a service provider or providers may implement networks in which service is provided under a "Third Generation" or "3G" protocol (e.g., a third generation CDMA protocol such IS-95, IS-2000, 1×RTT, 1×EV-DO, etc.) as well as under a "Fourth Generation" or 4G protocol such as LTE and/or WiMax. Service under both CDMA and LTE (or WiMAX) may be implemented in conjunction with the arrangement shown in FIG. 1, and more specific details of networks with overlapping CDMA and LTE will be discussed with reference to FIG. 2.

Figure 1:
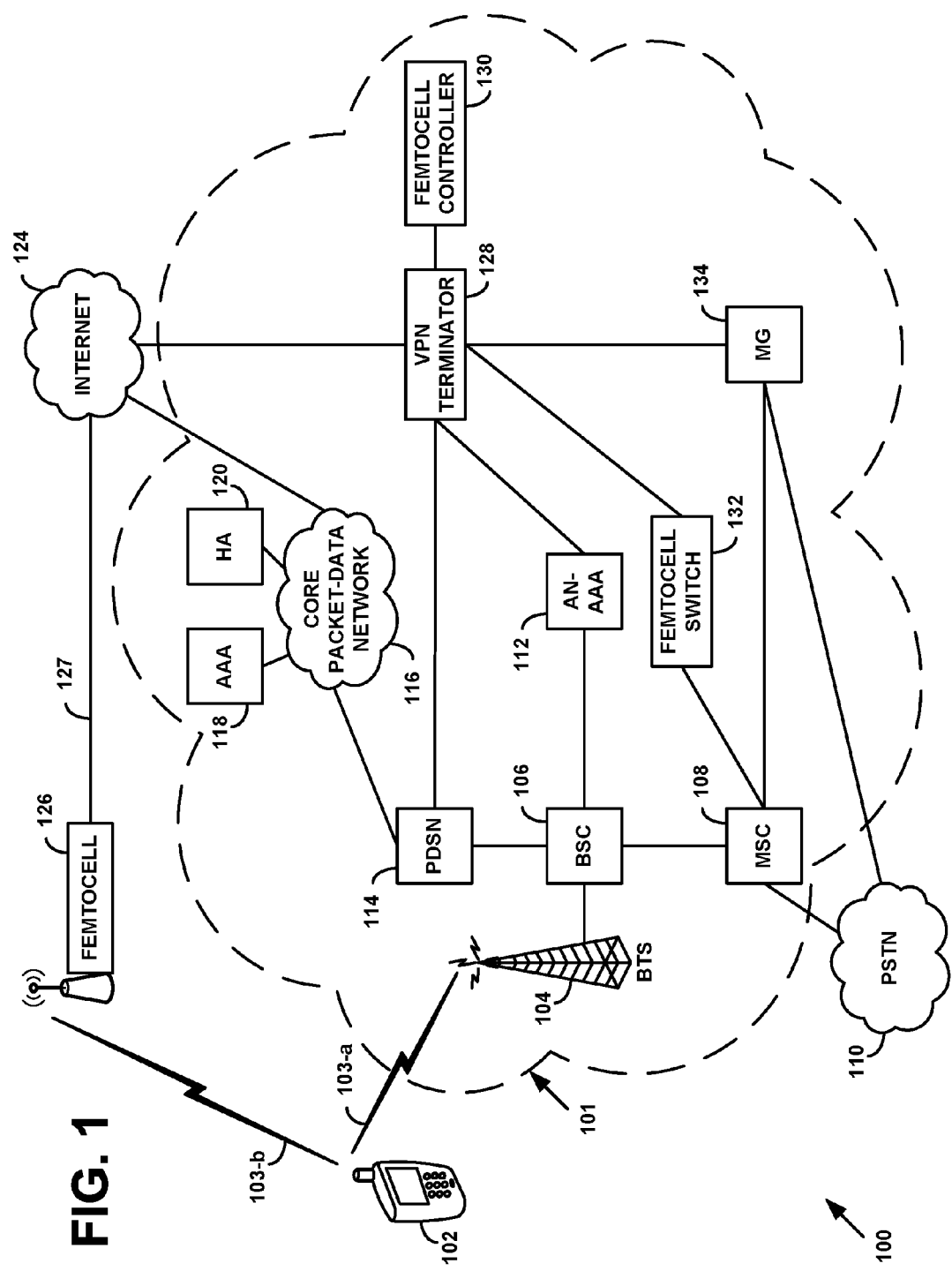
FIG. 1 is a simplified block diagram of a wireless communication system in which an exemplary embodiment of the present method can be implemented.

FIG. 1 is a simplified block diagram of a wireless communication network 100, in which an exemplary embodiment can be deployed. Generally, communication network 100 may operate according to various technologies including, but not limited to, Code-Division Multiple Access (CDMA), Worldwide Interoperability for Microwave Access (WIMAX®), Universal Mobile Telecommunications System (UMTS®), Long Term Evolution (LTE®), IDEN®, or 802.11 (Wifi). Thus, users may engage in communication via WCDs that support one or more of these or other technologies."

As shown in FIG. 1, a wireless communication device (WCD) 102 may communicate with a macro-cellular radio access network (RAN) 101 over an air interface 103-a. In particular, air interface 103-a may be provided by BTS 104, which may be coupled to or integrated with BSC 106. WCD 102 is also shown as having an air interface 103-b with a femtocell device 126 (which may also be referred to simply as a "femtocell").

Further, WCD 102 may include a user interface, which typically includes components for receiving input from a user of WCD 102 and providing output to a user of the WCD 102. Yet further, WCD 102 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

Transmissions over air interface 103-a from BTS 104 to WCD 102 may utilize a "forward link," while transmissions over air interface 103-a from WCD 102 to BTS 104 may utilize a "reverse link." Similarly, transmissions over air interface 103-b from femtocell device 126 to WCD 102 may utilize a forward link, while transmissions over air interface 103-b from WCD 102 to femtocell device 126 may utilize a reverse link. Each forward link and reverse link may comprise one or more logical traffic channels. Furthermore, the links of air interfaces 103-a and 103-b could be active concurrently or possibly at different times, depending on the operational state of WCD 102, the physical location of WCD 102 with respect to BTS 104 and femtocell device 126, and the type of communication session WCD 102 seeks or is engaged in.

BSC 106 may serve to control assignment of traffic channels (e.g., over air interface 103-a). BSC 106 may also be connected to mobile switching center (MSC) 108, which in turn may provide access to wireless circuit-switched services such as circuit-voice and circuit-data (e.g., modem-based packet data) service.

As represented by its connection to public-switched telephone network (PSTN) 110, MSC 108 may also be coupled with one or more other MSCs, other telephony circuit switches in the wireless service operator's (or in a different operator's) network, or other wireless communication systems. In this way, wireless communication network 100 may support user mobility across MSC regions, roaming between systems, and local and long-distance landline telephone services. Of course, part or all of MSC 108 may be replaced by softswitch components (not shown) that transport voice and other media over packet-switched networks.

BSC 106 may also be connected to access network authentication, authorization, and accounting (AN-AAA) server 112. AN-AAA server 112 may support link-level authentication and authorization for WCD data sessions. Data transport may be provided by way of a communicative link between BSC 106 and packet-data serving node (PDSN) 114, which in turn provides connectivity with the wireless service provider's core packet-data network 116. Nodes that may reside within or adjunct to core packet-data network 116 are, by way of example, an authentication, authorization, and accounting (AAA) server 118, and a mobile-IP home agent (HA) 120.

PDSN 114 may be a router-like device that manages the connectivity of WCDs to a packet-switched network, such as the core packet-data network 116, the Internet 124, or one or more private IP networks (not shown). In an example embodiment, PDSN 114 may serve tens, hundreds or thousands of WCDs via point to point protocol (PPP) links to each of these WCDs. However, a PPP link to a WCD is not required for PDSN 114 to serve a WCD. Preferably, PDSN 114 is capable of serving as a mobile-IP foreign agent. For example, PDSN 114 may be substantially compliant with the Internet Engineering Task Force Request For Comments (RFC) 2002 ("IP Mobility"), which is herein incorporated by reference in its entirety.

HA 120 is preferably an anchor point for WCDs that support mobile-IP. While a WCD, such as WCD 102, may change its point of attachment from one foreign agent to another (e.g., from one PDSN to another) as it roams between wireless coverage areas, WCD 110 preferably maintains a registration with the same HA. Furthermore, in order to maintain a substantially static home IP address, the WCD may receive a home IP address assignment from a HA.

AAA server 118 may provide network- and service-layer authentication and authorization support, and could be combined with AN-AAA server 112. Accordingly, AAA server 118 may support one or more of the well-known network protocols RADIUS (see for example, RFC 2865, "Remote Authentication Dial In Subscriber Service (RADIUS)," herein incorporated by reference in its entirety) and DIAMETER (see for example, RFC 3588, "Diameter Base Protocol," herein incorporated by reference in its entirety). AAA server 118 may maintain a profile for each WCD registered with the wireless service provider. Further, AAA server 118 may maintain profiles for other WCDs as well. Such a profile may contain an indication of the identity of each WCD and the WCD's subscriber (e.g., the WCD's user). For example, a profile for a given WCD may include the given WCD's NAI, MDN, IMSI, ESN, and/or MEID. Such a profile may also include a username, a password, and/or any other information related to the given WCD. Preferably, PDSN 114, HA 120, or both authenticate WCD sessions and/or service requests from WCDs with AAA server 118.

Core packet-data network 116 could comprise one or more additional switches, routers, and gateways (not shown) that collectively provide transport and interconnection among the various entities and networks of macro-cellular RAN 101. In this context, for instance, core packet-data network 116 could be an overlay on or a sub-network of one or more additional networks.

Continuing with the description of FIG. 1, macro-cellular RAN 101 may also include a virtual private network (VPN) terminator 128. VPN terminator 128 may be a standalone component or combined with HA 120 or other components of macro-cellular RAN 101. VPN terminator 128 may serve as an endpoint for secure connections with authorized devices seeking access to macro-cellular RAN 101 via unsecure, external networks such as the Internet 124. For instance, femtocell device 126 may connect to Internet 124 over a broadband connection 127 (e.g., a cable modem, digital subscriber line (DSL), or T-carrier connection) and then to VPN terminator 128. (Broadband connection 127 may be classified as a type of backhaul connection.) Femtocell device 126 could include a VPN client component that establishes a secure tunnel with VPN terminator 128, such that packet-data communications over the secure tunnel between femtocell device 126 and VPN terminator 128 can then take place securely. Secure tunnels can be implemented according such protocols as IP Security (IPsec), although other mechanisms may be employed.

Assuming a secure VPN connection is established between femtocell device 126 and VPN terminator 128, femtocell device 126 may then communicate securely with other entities in macro-cellular RAN 101 by way of the VPN terminator 128. In particular, femtocell device 126 may receive configuration and messaging data and other operational parameters from femtocell controller 130. Femtocell controller 130 may also provide similar control and services for other femtocell devices connected to network macro-cellular RAN 101.

Femtocell switch 132 may act as a signaling gateway between MSC 108 and VPN terminator 128, enabling access terminals communicating via femtocell device, such as WCD 102 via femtocell device 126, to engage in calls via MSC 108 to other wireless devices, as well as over PSTN 310. Media translation between packet-based media data and circuit-based media data may be carried out by media gateway (MG) 134. Thus, femtocell device 126 may transmit packetized data to MG 134 via VPN terminator 128. MG 134 may in turn translate or transcode the data to circuit-based media for transmission on PSTN 110, for example. MG 134 may perform the reverse translation for transmission in the opposite direction.

It should be understood that the term radio network controller (RNC) can also be used to refer to a BSC, or a combination of a BTS and BSC. Accordingly, a femtocell device may be considered to be form of micro-type RNC. Further, the combination of a BTS and a BSC in a macro-cellular RAN may be referred to as a macro base station. However, a BTS or BSC could, taken alone, be considered a macro base station as well. Yet further, a femtocell device could also be considered a type of base station. Accordingly, references to a "base station" herein may apply to, but are not limited to a femtocell or a macro base station such as a BTS, a BSC, or a combination BTS and BSC, among other possibilities.

A femtocell device 126 may be deployed on user premises, such as within a residence or within a business, to provide additional wireless network coverage to that residence or business. However, femtocell devices can, in general, be deployed anywhere to provide wireless network coverage. Thus, wireless coverage areas defined by femtocell devices may overlap with wireless coverage areas from macro-cellular RNCs. WCDs may seek to register with either a femtocell device or a macro-cellular RNC based on the respective signal strengths that the WCD receives from each of these devices, and/or based on other factors. For instance a WCD may be arranged to prefer using a femtocell device over a macro-cellular RNC when both are available.

Furthermore, a femtocell device 126 may have a small form factor, as least when compared to that of a macro-cellular RNC, so that the femtocell device can be easily deployed in a location, or moved between locations. Thus, for instance, femtocell devices may be sold directly to consumers, in stores or online, and may be deployed by consumers in a residential or business network. As discussed above, a femtocell device may be directly or indirectly coupled to a residential or business broadband network service, such as a cable modem, DSL, or T-carrier connection, so that the femtocell device can communicate via the Internet. This use of wireline access to the Internet serves to offload traffic from macro-cellular RANs.

Additionally, a femtocell device 126 may be configured to provide either voice service, data service, or both, to WCDs. Thus, in some arrangements, a femtocell device may provide data service to WCDs, but if these WCDs attempt to use the femtocell device for voice calls, the femtocell device may redirect WCDs to a macro-cellular RNC. In other arrangements, the femtocell device may support circuit voice or voice-over-IP services for these WCDs. Alternatively, other means may be used to distribute voice and data services between the femtocell device and a macro-cellular RNC.

It should also be understood that the depiction of just one of each network component in FIG. 1 is illustrative, and there could be more than one of any component. Communication network 100 may also contain other types of components not shown. Alternatively or additionally, any network component in FIG. 1 could be omitted, or combined with another network component, without departing from the scope of the invention. Thus, the particular arrangement shown in FIG. 1 should not be viewed as limiting with respect to the present invention.

Further, the network components that make up a wireless communication system such as communication network 100 are typically implemented as a combination of one or more integrated and/or distributed platforms, each comprising one or more computer processors, one or more forms of computer-readable storage (e.g., disks drives, random access memory, etc.), one or more communication interfaces for interconnection between components and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein.

FIG. 1 depicts a representative WCD 102 by way of example, and this WCD 102 could be a cell phone, tablet, laptop computer, wirelessly equipped personal digital assistant (PDA), personal computer, home electronic device, or any other type of wirelessly-equipped device now known or later developed.

WCD 102 may be equipped with hardware, software, and/or other logic to communicate with RAN 101 in accordance with an agreed communication protocol, such as one of the protocols noted herein for instance. For example, in an exemplary embodiment, a WCD includes a wireless communication interface that functions to facilitate air interface communication with macro-cellular RAN according to LTE.

Further, WCD 102 may include a user interface, which typically includes components for receiving input from a user of WCD 102 and providing output to a user of the WCD 102. Yet further, WCD 102 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

In a further aspect, each WCD 102 operating in the RAN 101, such as WCD 102, typically has at least one associated identifier that uniquely identifies the WCD. By way of example, a WCD may have a unique mobile directory number (MDN), a unique International Mobile Subscriber Identity (IMSI), a unique MAC address, or some other identifier dynamically or statically assigned to the WCD, which may serve as its address for receiving air interface communications transmitted to it by the RAN 101. As a specific example, an IMSI is a unique number associated with the WCD, typically taking the form of the mobile station's phone number. Additionally or alternatively, each WCD may be assigned a mobile identification number (MIN).

Figure 2:
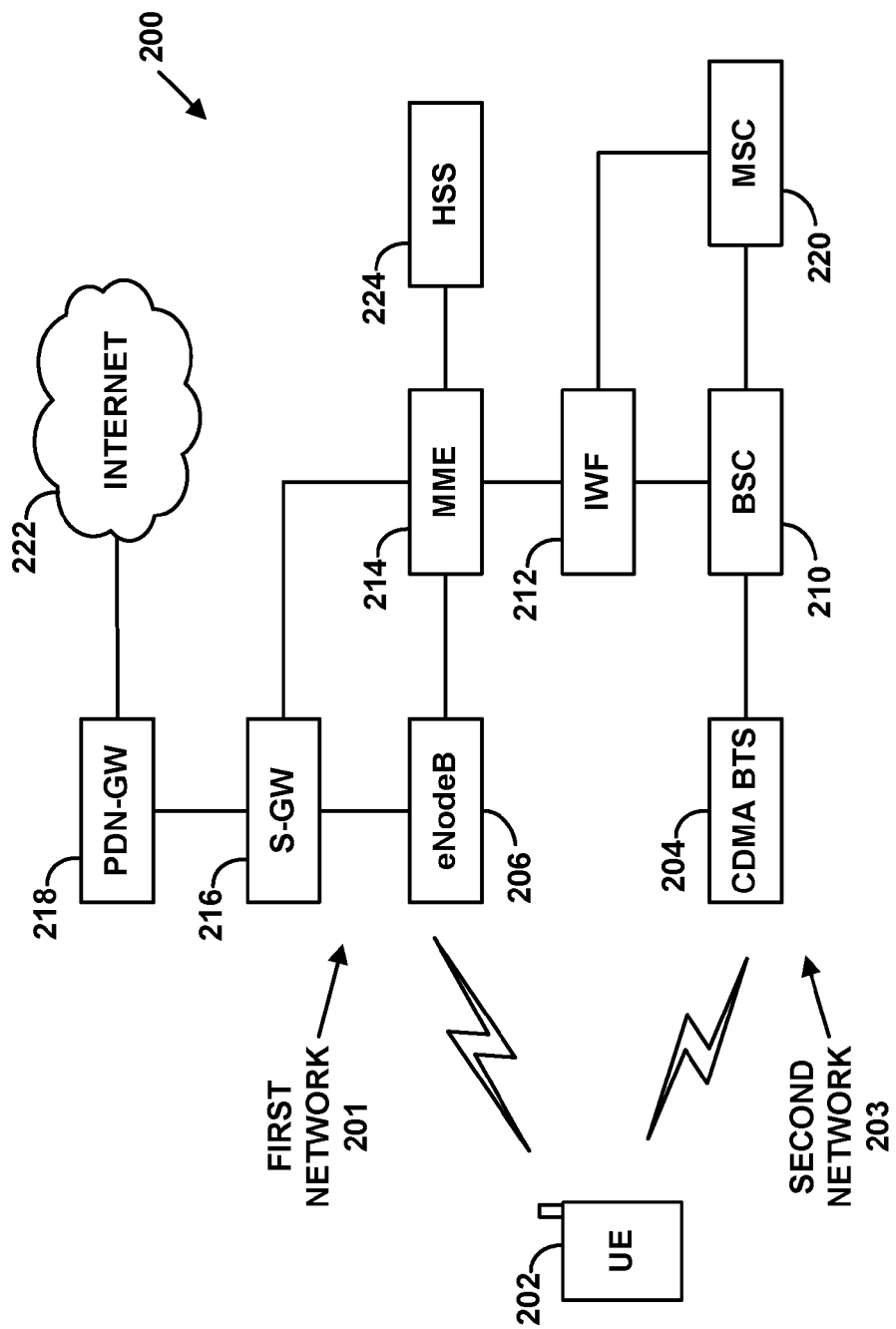
FIG. 2 is a simplified block diagram of a wireless communication system in which a service provider supports wireless service under two or more different air interface protocols, according to an exemplary embodiment.

FIG. 2 is a simplified block diagram of a wireless communication network 100, in which an exemplary embodiment can be deployed. In particular, FIG. 2 illustrates a wireless communication system 200 in which a service provider supports wireless service under two or more different air interface protocols. The example of FIG. 2 shows an exemplary RAN that is configured to provide service under both CDMA and LTE. Note that while FIG. 2 is described as showing a single RAN that provides service under both LTE and CDMA, the illustrated components and functions thereof could also be part of two separate RANs, one RAN provides LTE service and one that provides CDMA service, which communicate with one another via an internetworking function (IWF).

A UE 202 that is operating in system 200 may connect and communicate under different air-interface protocols, such as CDMA and LTE. In practice, system 200 may include two or more separate access networks with overlapping coverage areas (e.g., separate access networks for LTE and CDMA). For example, wireless communication system 200 illustrates an exemplary RAN comprising a first wireless network 201 and a second wireless network 203. In this example, the first wireless network 201 is configured to provide service under LTE, and the second wireless network 203 is configured to provide service under CDMA. Alternatively, some or all components may be combined so as to support both CDMA and LTE communications, for example.

In the illustrated configuration, system 200 (and in particular second wireless network 203) includes components to provide for CDMA communications. Specifically, FIG. 2 shows a BTS 204, a BSC 210, and an MSC 220, which collectively (and possibly in conjunction with other components that help to provide service under CDMA) may be referred to as CDMA network 203. Note that BTS 204, BSC 210, and MSC 220 may be configured for the same or similar functions as BTS 14, BSC 50, and MSC 52, which were described in reference to FIG. 1.

System 200 also includes components to provide a UE 202 with service under LTE. In particular, system 200 (and more particularly second wireless network 201) includes one or more eNodeBs 206, which are base stations configured to support over-the-air communications with UEs 202 under LTE. Each eNodeB 206 may provide service under LTE in one or more coverage areas, such as a cell or one or more cell-sectors. To support LTE communications, system 200 also includes a mobility management entity (MME) 214, which may be configured to control communications between one or more eNodeBs 206 and a serving gateway (S-GW) 216. MME 28 may also be communicatively coupled to a home subscriber server (HSS) 224, which stores subscriber information, such as information related to UE 202. More generally, an MME 214 may support functionality such as mobility management, bearer management, paging-message distribution, security functions, authentication of UEs, gateway selection for communications, and so on.

In an exemplary configuration, S-GW 216 may be configured to communicate with one or more eNodeBs 206 and/or with MME 214 in order to provide various functions such as packet routing and forwarding, mobility anchoring, packet buffering, and so on. For instance, S-GW 216 may provide packet routing for LTE communications to and/or from UE 202. Yet further, an LTE access network 201 may include a packet data network gateway (PDN-GW) 218, which facilitates packet-data communications between an S-GW 216 that operates according to LTE, and a packet-data network, such as the Internet 222.

In a further aspect, system 200 includes an IWF 212, which may be a functional component of the system that supports interworking between different wireless technologies, such as CDMA and LTE. In an exemplary configuration, IWF 212 may support communications between components of LTE network 201 (e.g., MME 214) and components of CDMA network 203 (e.g., BSC 210 and/or MSC 220), so that a service provider may implement CSFB or eCSFB functionality.

A UE 202 that is configured for CSFB and/or eCSFB may register with the CDMA-portion of system 200 via an LTE network 201. For example, a UE 202 may send CDMA registration messages via an eNodeB 206 and an MME 214. The IWF 212 may be configured to encapsulate and relay such CDMA registration messages to MSC 220, in order to register UEs with the CDMA network 203.

As part of the registration process, a UE 202 may receive a system information block (SIB) message referred to as a "SIB8 message," which includes system information for the CDMA network. The provided system information may help a UE access and connect to the CDMA network. For example, a SIB8 may include a channel list that indicates one or more CDMA channels (in one or more CDMA coverage areas) that overlap with and/or are near to the UE's current location (e.g., that overlap with and/or are near to the coverage area of the LTE network in which the UE is the registering). The one or more channels may be scanned by a UE 202 during a circuit switch fall back process, in order to access the CDMA network 203.

Note that in practice, an LTE network 201 typically designates one channel for circuit switch fall back in a given coverage area. As such, SIB8 messages may indicate a single channel to be scanned when a UE 202 falls back to a CDMA network 203. However, it is contemplated that the embodiments described herein may be implemented in scenarios where one or multiple channels are designated for fall back to a CDMA network 203. Further, note that the SIB8 message may be sent and received at times other than registration. Moreover, some or all of the information described as being included in a SIB8 message could also be included in other messaging between an LTE network 201 and a UE 202.

To facilitate CSFB and/or eCSFB functionality, an LTE network 201 may use, e.g., S102 tunnel redirection, to establish an LTE tunnel between an IWF 212 and a UE 202 via MME 214 and eNodeB 206. IWF 212 may then use the LTE tunnel for CDMA messaging with the UE 202 (e.g., messaging that would typically have occurred over a CDMA paging channel and/or a CDMA access channel). Accordingly, when a UE 202 connects to LTE network 201 via an eNodeB 206, it can communicate with CDMA MSC 220 through IWF 212, which functions to bridge the LTE network 201 and CDMA network 203, and to encapsulate and relay CDMA messages between the UE 202 and the MSC 220.

Under CSFB, a UE 202 may, by default, operate with its CDMA receiver powered down, and only listen for pages via an LTE paging channel. Thus, when a RAN needs to page a wireless communication device for a voice call, the LTE network 201 may first page the UE via an LTE paging channel. In particular, when the 3G (e.g., CDMA) network 203 seeks to page a UE, the CDMA network 203 sends a page message to the LTE network 201, which then sends the page message to the UE 202. To do so, the IWF 214 may send the page message via the MME 214 to the eNodeB 206 that is serving the UE 202, so that the eNodeB 206 can transmit the page message to the UE. The UE 202 may then respond by, e.g., sending an Extended Service Request (ESR) message to the LTE network 201 to indicate a switch back to the CDMA network 203. Upon such response from the UE 202, the eNodeB 206 may send a message to the UE to direct the UE to connect to the CDMA network 203 and suspends LTE service to the UE.

The UE 202 then scans for CDMA coverage and goes through an acquisition process with the CDMA network, including, for example, reading the pilot and sync channels, and requesting and receiving assignment of a traffic channel. To do so, the UE 202 may use system information for the CDMA network 203 that was provided to the UE in a SIB8. For example, the UE 202 may then power on its CDMA receiver, scan the channel or channels that are identified in by the SIB8 message for fall back to the CDMA network, send a page response message to the CDMA network 203, and proceed to conduct the voice call via the CDMA network 203.

When eCSFB is implemented, a RAN may generally use its 3G traffic channels for voice calls and 1x-data calls, while using LTE signaling channels for both paging and access functionality. As a result, a base station that implements eCSFB may use the LTE control channel for both LTE control channel messages and CDMA control-channel and paging-channel messages (e.g., for CDMA paging, CDMA call origination, SMS, CDMA feature notification, and other CDMA overhead message), whenever the device with which it is communicating is compatible with such functionality. In particular, in an eCSFB scenario, when the 3G (e.g., CDMA) network 203 seeks to page a UE 202, the CDMA network sends a signal to the LTE network 201 via IWF 212, which in turn sends the signal to the UE via MME 214 and eNodeB 206.

However, in contrast to a standard CSFB scenario, once the UE 202 responds to the eNodeB 206, the IWF 212 sends access information to the UE and coordinates with the CDMA network 203 to set up the CDMA connection for the UE. In particular, the LTE network 201 may send the UE 202 a pilot measurement request. The UE 202 may then measure the pilot signal strength of any pilot signals detected on the channels indicated in the most recent SIM message, and send a measurement report to the LTE network 201 identifying detected channels and/or corresponding pilot-signal strengths by, e.g., sending a Pilot Strength Measurement Message (PSMM) or Power Measurement Response Message (PMRM) to the IWF 212 via the LTE tunnel. In addition, the UE 202 may send a CDMA page response message to the IWF via the LTE tunnel. The IWF can then forward the pilot strength measurement report and/or the page response message to CDMA MSC 220.

The CDMA MSC 220 may then select a sector (e.g., corresponding to one of the measured pilot signals) in which the UE 202 should connect, and send an assignment message to the IWF 212. The IWF 212 can then communicate with the CDMA BTS 204 that serves the assigned sector so that the BTS can reserve resources and/or set up a traffic channel for the UE 202 to use for a voice call. The IWF 212 also sends a channel assignment message, such as an Extended Channel Assignment Message (ECAM), to the UE 202 via the LTE tunnel. The channel assignment message may indicate the assigned CDMA traffic channel. The UE 202 then quickly moves over to operating on the assigned CDMA channel, without needing to go through the acquisition process that it would go through with standard CSFB. As a result, the eCSFB process may be faster than a standard CSFB process as far as setting up a call for the UE on the CDMA network 203.

It should be understood that the network arrangements shown in FIGS. 1 and 2 and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software.

For instance, the various functions of a UE that are described herein may be carried out by a processor executing program instructions stored in memory or another type of machine-readable medium (i.e., data storage, rather than a mere signal). For instance, in an exemplary embodiment, a UE 202 may include data storage having program instructions stored therein, which may be executable to periodically initiate scans to detect channels that are available for communication under a second protocol (e.g., a CDMA protocol). Further, when the UE detects at least a first channel that is available for communication under the second protocol during a given scan, the program instructions may be further executable to determine that the first channel is an unlisted channel, which is not included on a predetermined channel list (e.g., by determining that the channel was not identified by in the SIB8 message as a channel to scan when falling back to a CDMA network). Further, the program instructions may be executable to respond to the determination that the first channel is unlisted, by causing the UE to send, to a first access network (e.g., an LTE network), a message that identifies the first channel. By notifying the first access network of such an unlisted channel can coordinate with the second access network to re-provision the base station that is operating on the first channel, to instead operate on a second channel that is included on the predetermined channel list.

II. EXAMPLE RAN COMPONENTS

Figure 3:
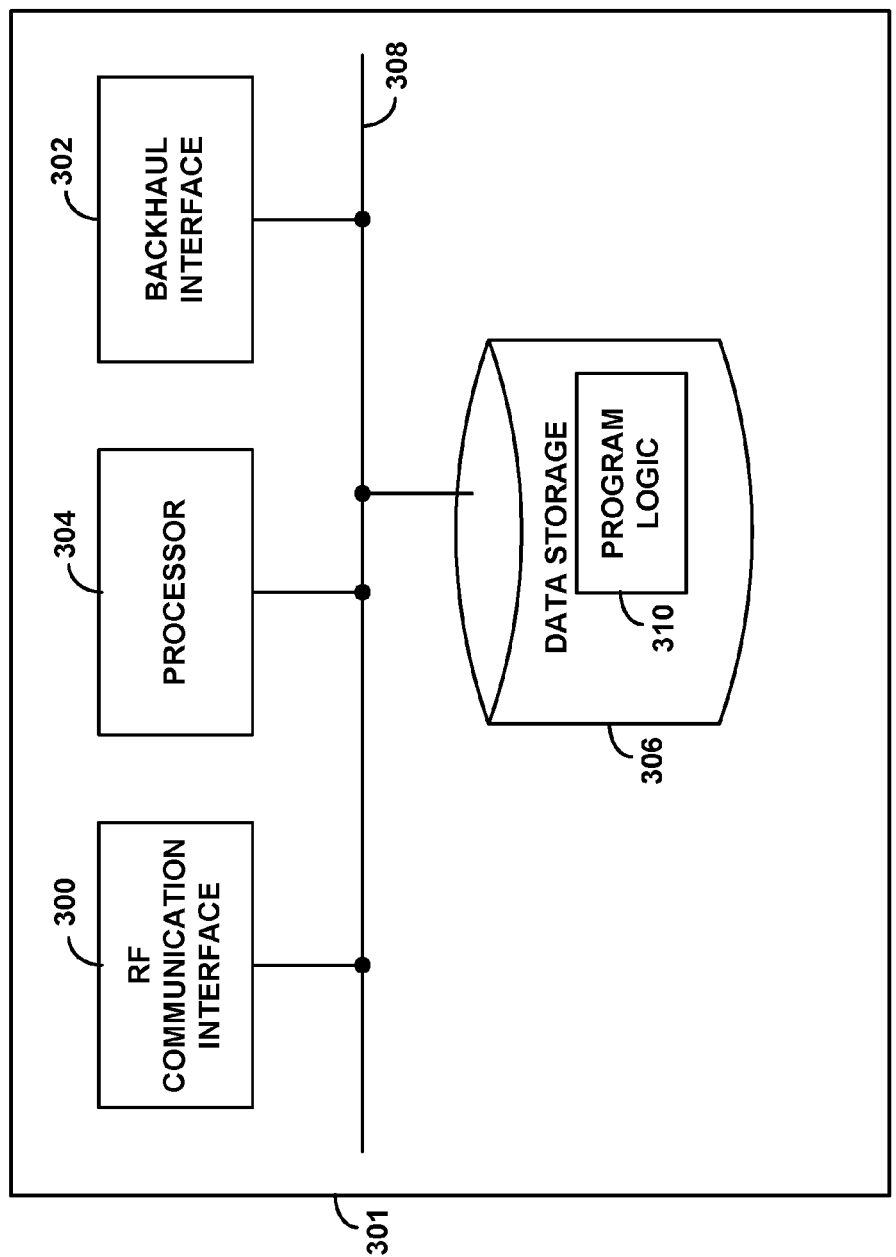
FIG. 3 is a simplified block diagram exemplifying a RAN component, according to an exemplary embodiment.

FIG. 3 is a simplified block diagram exemplifying a RAN or RAN component, according to an exemplary embodiment. In particular, FIG. 3 illustrates some of the components that would likely be found in a RAN component 301 arranged to operate in accordance with the embodiments herein. As shown, the RAN component 301 may include an RF communication interface 300, a backhaul interface 302, a processor 304, and data storage 306, all of which may be communicatively linked together by a system bus, network, or one or more other connection mechanisms 308.

In practice, RAN component 301 may take the form of or include one or more BTS and/or a BSC, such as eNodeB 206 and/or BSC 210 for instance, or may take the form of a switch, such as MSC 220. Accordingly, the illustrated components of RAN component 301 (e.g., communication interface 300, a backhaul interface 302, a processor 304, and data storage 306) may be distributed and/or subdivided between one or more BTSs, a BSC, and/or an MSC, or may be implemented in a single BTS, a single BSC, or a single MSC. It should be understood that an exemplary system may also take the form of another network entity or combinations of other network entities, without departing from the scope of the invention. Further, an exemplary system may be implemented in or provided in communication with a base station (or implemented in or provided in communication with any other network entity or entities arranged to carry out analogous functions).

RF communication interface 300 may comprise one or more antenna structures, one or more power amplifiers, and associated equipment, for engaging in RF communication with mobile stations operating within the base station's coverage, according to one of the air interface protocols noted above for instance. Backhaul interface 302 may comprise any sort of communication link or mechanism enabling the base station to exchange signaling and bearer data with other RAN entities, such as with MSC 220 for instance. Processor 304 may comprise one or more processors (e.g., general purpose and/or special purpose processors), such as microprocessors for instance.

Data storage 306 may be a non-transitory computer readable medium. For example, data storage 306 may take the form of one or more volatile and/or non-volatile storage components, such as magnetic, optical, or organic storage components, integrated in whole or in part with processor 304. As further shown, data storage 306 contains program logic 310 (e.g., machine language instructions) executable by processor 304 to carry out various functions, such as the functionality of the exemplary methods and systems described herein.

In an exemplary embodiment, data storage 306 may include program instructions that are executable by a component or components of a first access network (e.g., an LTE network) to: (a) receive a first message that indicates one or more detected channels that were detected by a UE during a scan for service under a second protocol (e.g., a CDMA protocol), (b) determine that at least a first detected channel is an unlisted channel that is not included on a predetermined channel list (e.g., a channel that the SIBS message does not identify for purposes of fall back to the CDMA network), and (c) responsively send a channel-update message to a second access network (e.g., a CDMA network), which indicates to the second access network to re-provision the base station that is operating on the first detected channel to instead operate on a second channel that is included on the predetermined channel list (e.g., to a channel that the SIB8 instructs a UE to scan when falling back to the CDMA network).

In an exemplary embodiment, a data storage 306 may include program instructions that are executable by a component or components of a first access network (e.g., an LTE network) to: (a) initiate a scan to detect one or more channels that are available for communication under a second protocol (e.g., a CDMA protocol) where at least a first channel that is available for communication under the second protocol is detected during the scan, (b) responsive to a scan in which at least a first channel that is available for communication under the second protocol is detected, determine that the first channel is an unlisted channel that is not included on a predetermined channel list, and (c) responsive to the determination that the first channel is unlisted, send, to a first access network (e.g., an LTE network), a message that identifies the first channel. By notifying the first access network of such an unlisted channel can coordinate with the second access network to re-provision the base station that is operating on the first channel, to instead operate on a second channel that is included on the predetermined channel list.

III. EXAMPLARY METHODS

A. Exemplary Functions of a User Entity

Figure 4:
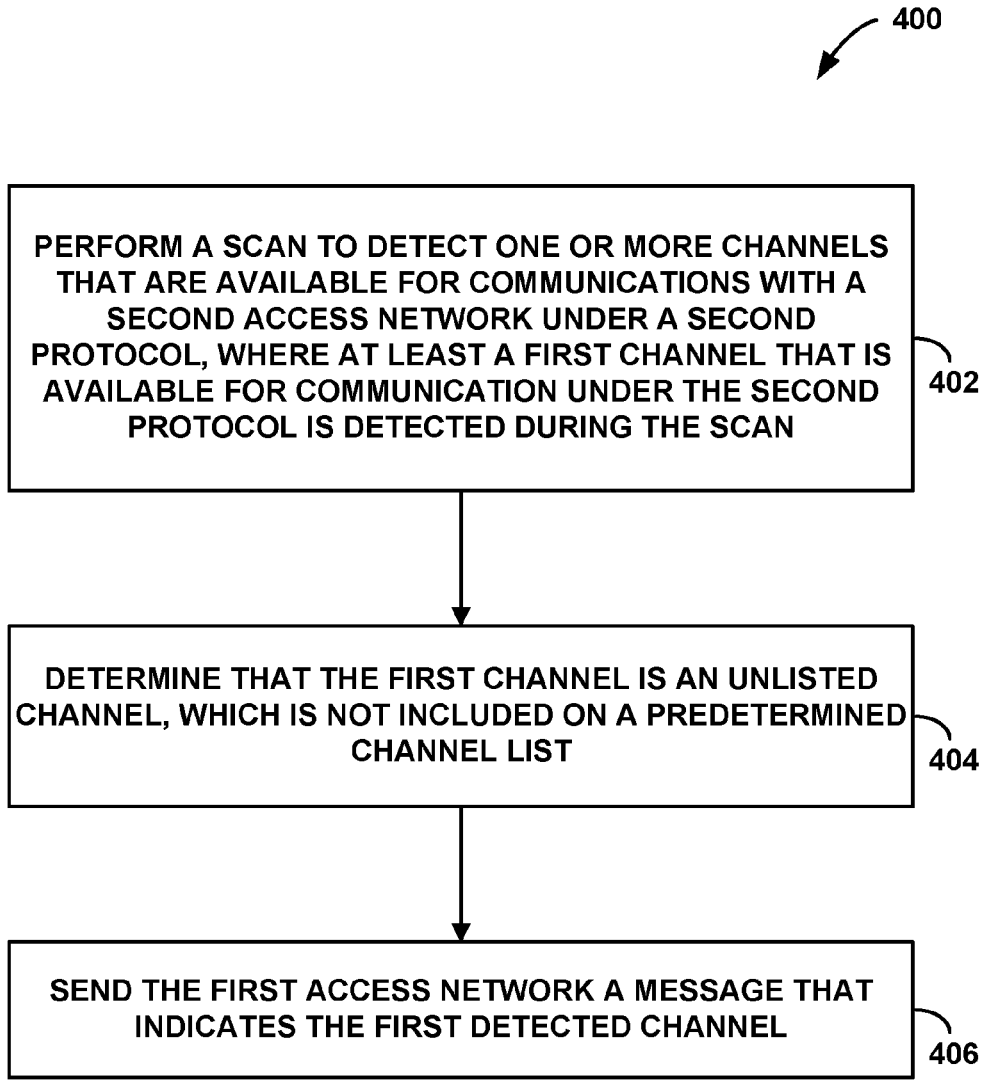
FIG. 4 is a flow chart illustrating a method, according to an exemplary embodiment.

FIG. 4 is a flow chart illustrating a method 400, according to an exemplary embodiment. The method may be carried out by a UE, such as UE 202 shown in FIG. 2, for example. The UE may be configured to communicate with a first access network under a first protocol and to communicate with a second access network under a second protocol. Herein, exemplary methods, such as method 300, may be described by way of example with reference to a configuration where a UE is configured for communications with both an LTE network and a CDMA network, and in which the LTE network and/or UE are configured for CSFB and/or eCSFB functionality, such that the UE can receive CDMA calls using the CDMA network. It should be understood, however, that the described examples may be implemented in other configurations.

A UE may implement method 400 to help improve coordination between two access networks that provide service under different protocols. In particular, a UE that is configured for CSFB and/or eCSFB may implement the method to help utilize additional CDMA base stations, such as CDMA femtocells, which may provide better. For instance, under eCSFB, a UE that is instructed to scan CDMA channels for a voice call may only scan the channel or channels that are identified to the UE by the LTE network, such as those the channel or channels identified in a SIM message. Further, a SIB8 message may only identify a "standard" channel or channels. In particular, SIB8 messages typically indicate only a channel or channels that are assigned to macro base stations. In this scenario, a UE could miss a CDMA base station, such as a femtocell, that is not operating on such a standard channel. Accordingly, a UE that operates according to CSFB or eCSFB may implement method 400 to help identify and utilize CDMA femtocells and/or other CDMA base stations, which otherwise might go undetected and/or unutilized when implementing CSFB or eCSFB.

Referring to method 400 in greater detail, block 402 involves a UE performing a scan to detect one or more channels that are available for communications with the second access network under the second protocol, where at least a first channel that is available for communication under the second protocol is detected during the scan. Further, the UE may determine that the first channel is an unlisted channel, which is not included on a predetermined channel list, as shown by block 404. The UE may then send the first access network a message that indicates the first detected channel, as shown by block 406.

In an exemplary embodiment of method 400, the first access network is configured to provide service under an LTE protocol, and the second access network is configured to provide service under a 3G protocol, such as CDMA. As such, block 402 may involve the UE scanning one or more CDMA channels for pilot signals and/or measuring the pilot signal strength of detected pilot signals. In some embodiments, a particular channel may be provided on a certain carrier frequency. As such, the scan performed at block 402 may involve a UE tuning to each of one or more carrier frequencies and listening for a pilot signal on each carrier frequency.

In an exemplary embodiment, the scan at block 402 may be performed for the purpose of identifying any unlisted channel, which is not identified in a predetermined channel list provided by the LTE network, and which may provide better service than would be provided over the channels that are typically included in the predetermined channel list. Herein, a channel that is included on a predetermined channel list may be referred to as a "listed channel," while a channel that is not included on the predetermined channel list may be referred to as an "unlisted channel." Note that other types of predetermined channel lists, which indicate the channels a UE should scan when falling back from a first network to a second network, are also possible.

In some embodiments, the scan performed at block 402 may be performed for the purpose of identifying any unlisted channel that is "available for communication under the second protocol." In some implementations, an unlisted channel may be considered to be available for communication based on the fact it was detected. For example, a given CDMA channel may be considered to be available for CDMA communications if a pilot signal is detected (e.g., in association with the carrier frequency of the unlisted channel). Accordingly, at block 406, a UE may report any unlisted CDMA channel that is detected during the scan at block 402.

In other implementations, an unlisted channel may only be considered to be available for communication when the UE determines that the unlisted channel could potentially provide better service than would be provided over the channels that are typically included in the predetermined channel list. As an example, an unlisted CDMA channel may only be considered to be available for communications with the CDMA network and reported to the LTE network, when a pilot signal is detected and meets certain signal-strength requirements. For instance, a UE and/or RAN might apply techniques that are similar to those used when determining whether to add a sector to a UE's active set, in order to determine whether the signal strength over an unlisted CDMA channel justifies notifying the LTE network, so that the CDMA base station that is operating on the unlisted channel can be provisioned to operate on a listed channel. Other techniques may also be used to evaluate whether the signal strength over an unlisted CDMA justifies provisioning the channel's serving base station to instead operate on a listed channel.

As explained above, a SUM message or another type of overhead message may provide the predetermined channel list that identifies which channel or channels a UE should scan when acquiring CDMA service, according to circuit-switch fall back procedure. (In practice, this "list" may simply be an indication of a single channel, but could also be a list of multiple channels.) Thus, the scan performed at block 402 may be intended to identify when CDMA service is available over a channel that is operating an unlisted channel. As such, the scan at block 402 may include unlisted channels. (Importantly, the scan at block 402 should not be confused with the scan performed by a UE when actually switching to a CDMA network for a call.) Further, note that the scan at block 402 may only include unlisted channels, or might include both listed and unlisted channels, depending upon the particular implementation.

To assist a UE in performing a scan of unlisted channels that are nearby, the LTE network may provide a second channel list, which indicates which unlisted channels the UE should scan at block 402. For example, such a second channel list may be provided in a SIB8 message or in another overhead message that is sent by the LTE network, in addition to the predetermined channel list, which indicates another channel or channels to scan when falling back to the CDMA network. To do so, an eNodeB may communicate with the CDMA network via the MME and IWF, in order to identify any CDMA base stations operating on unlisted channels, which serve a coverage area that is near to and/or overlaps with the coverage area of the eNodeB (or, other entities of the LTE network may identify such nearby CDMA base stations for the eNodeB). Provided with this information, the eNodeB may identify any unlisted channels to UEs that register in the coverage area of the eNodeB, such as by identifying an unlisted channel or channels in a SIB8 message, or in another message that is sent to UEs in the coverage area of the eNodeB.

Importantly, the scan performed at block 402 may be carried out by the UE independently from any particular voice call or transfer from the first network to the second network. In particular, the UE may perform method 400 to proactively notify the LTE network of nearby unlisted channels, so that the LTE network can coordinate with the CDMA network to have the CDMA base station serving the unlisted channel switch to a listed channel before a voice call is received. If a voice call is subsequently received for the UE, and the UE carries out a typical process under CSFB or eCSFB in which the UE scans channels indicated by a predetermined channel list (e.g., channels indicated in a SIB8 message), then the UE may detect a pilot signal on the listed channel that is being served by the CDMA base station that was previously serving the unlisted channel.

In an exemplary embodiment, block 406 may involve the UE reporting the unlisted channel and PN offset on which it detected a pilot signal that meets certain signal-strength criteria, to its serving eNodeB. The eNodeB may then forward this information to the CDMA network via the MME and/or the IWF. In the event that the unlisted channel is served by a femtocell, the femtocell controller of the CDMA may use the indicated channel and PN offset to identify the particular femtocell that was detected by the UE. Further, in some cases, the UE may include location information, such as its GPS coordinates, when it sends a message that indicates it has detected an unlisted channel. The location information may further assist the femtocell controller in identifying the femtocell that is operating on the unlisted channel. The femtocell controller can then provision this femtocell to operate on a listed channel.

In a further aspect, an exemplary UE may periodically perform block 402 to scan for service under the second protocol. By scanning for CDMA coverage periodically, the UE may keep the LTE network apprised of nearby CDMA base stations that are operating on an unlisted channel, so that such CDMA base stations can temporarily switch to listed channels while the UE is nearby. To do so, the UE may carry out block 406 to send a message to the first access network whenever the UE detects that a nearby CDMA base station is operating on an unlisted channel.

Additionally, when the UE periodically scans for coverage in the second access network, there may be instances where no coverage is detected on unlisted channels (or when it is determined that no signals on unlisted channels have a signal strength meeting some signal-strength criteria). After a scan where the UE does not detect any unlisted channel that is available for CDMA communication, the UE may simply send the first access network a message that indicates this fact (without explicitly identifying any particular base stations or channels). Or, in other implementations, when no unlisted channel is detected, the UE may not send any message at all. As such, the UE may only report to the LTE network when the UE detects an unlisted channel is available for CDMA communications.

Alternatively, the UE may send a message to the LTE network after each periodic scan to notify the first access network of base stations that were detected as operating on unlisted channels. In such an implementation, the UE may communicate the results of a scan to the first access network, regardless of whether or not the UE detected any base station operating on an unlisted channel. For example, after each scan for CDMA coverage, the UE could send the LTE network a message that identifies each channel that was detected, and indicates whether each identified channel is listed or unlisted. In a variation, the UE may only send a message that individually identifies the detected channels that are detected during a scan, when the UE detects at least one CDMA base station that is operating an unlisted channel. When a given scan does not reveal any base stations operating on an unlisted channel, the UE may simply send the first access network a message that indicates this fact (without explicitly identifying any particular base stations or channels).

B. Exemplary Functions of a First Access Network

Figure 5:
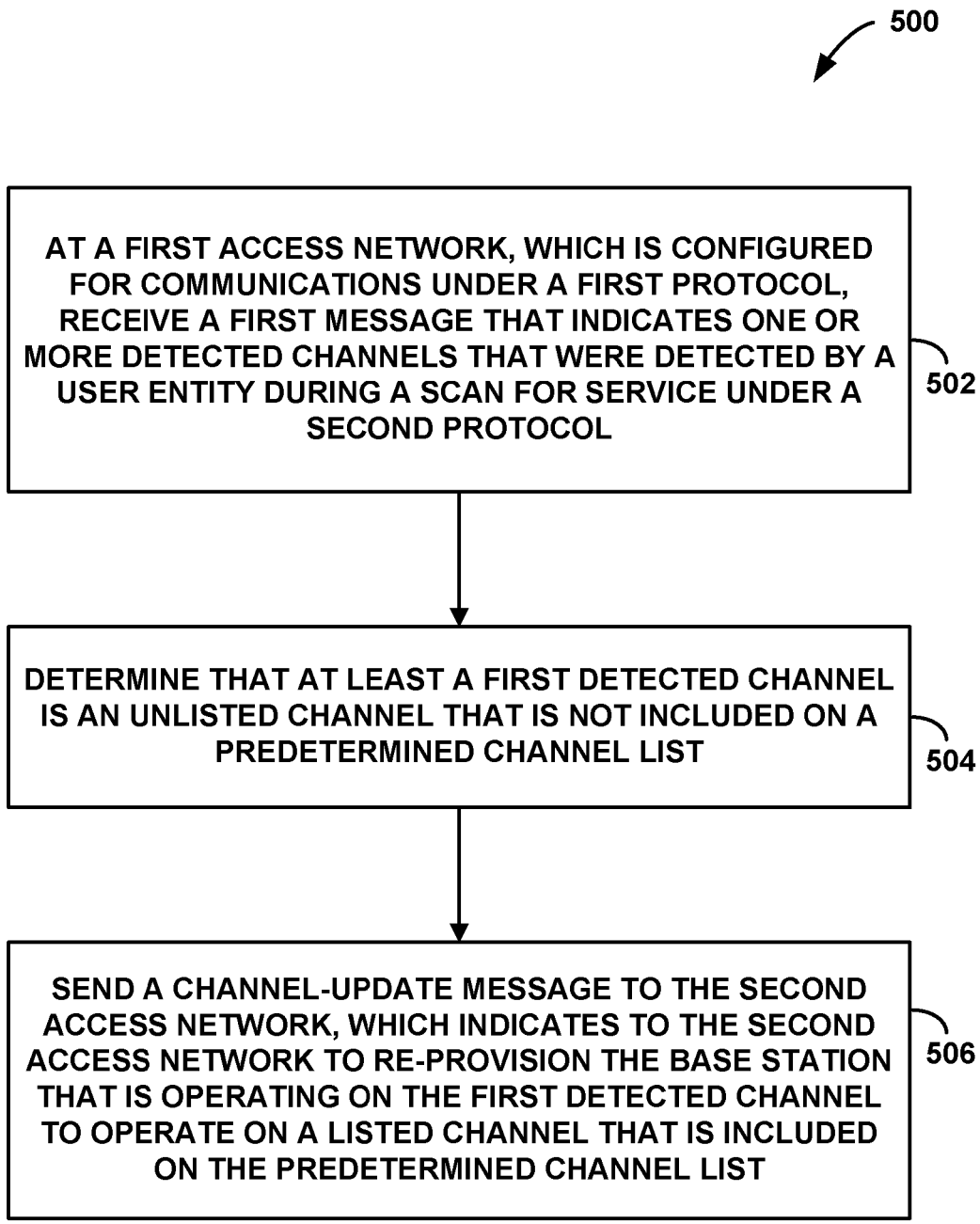
FIG. 5 is a flow chart illustrating another method, according to an exemplary embodiment.

FIG. 5 is a flow chart illustrating a network-implemented method 500, according to an exemplary embodiment. In particular, method 500 may be implemented by a first access network (e.g., by one or more components of the network) to help improve service when a transfer to a second network occurs. For instance, method 500 may be implemented in an LTE network to help improve service when a UE is transferred from an LTE network to a CDMA network for a voice call, according to a typical CSFB and/or eCSFB process.

As shown by block 502, method 500 may involve a first access network, which is configured for communications under a first protocol, receiving a first message that indicates one or more detected channels that were detected by a user entity (UE) during a scan for service under a second protocol. The first access network may then determine that at least a first detected channel is an unlisted channel that is not included on a predetermined channel list, as shown by block 504. The first access network may responsively send a channel-update message to the second access network, which indicates to the second access network to re-provision the base station that is operating on the first detected channel to operate on a listed channel that is included on the predetermined channel list, as shown by block 506.

In an exemplary embodiment, method 500 may be partially or wholly implemented by an IWF in an LTE network, such as IWF 212 of FIG. 2. Accordingly, block 502 may involve an IWF receiving a message, such as a message that is sent by a UE at block 406 of method 400. Specifically, the UE may send such a message to its serving eNodeB, which in turn may forward the message to the IWF (possibly via an MME).

The message received at block 502 may identify a serving entity or entities, such as base station(s) in a CDMA network. Further, such CDMA base stations may be macro base stations or femtocells. In an exemplary embodiment, the received message may identify the detected serving entity or entities by identifying the unlisted channel, and possibly the PN offset, where CDMA service was detected by the UE. The received message may also include location information indicating the location of the UE. As such, when the LTE provides this information to a CDMA network, the CDMA network can determine the serving base station based on the unlisted channel and PN offset that are indicated by the UE (and possibly the UE's location as well). Additionally or alternatively, the received message may identify the detected serving entity or entities by indicating a base station ID number, a femtocell ID number, and/or other forms of identification information for each serving entity.

At block 504, the function of a first access network determining that at a given detected serving entities is operating on an unlisted channel, may simply involve an IWF determining which serving entity or serving entities are operating on an unlisted channel that is identified in the message received at block 502. More specifically, in some embodiments, a UE may only include unlisted channels in the message. Thus, the IWF may conclude by virtue of the fact that a channel is identified in the message received at block 502, that the base station for the identified channel is operating on an unlisted channel. Alternatively, this functionality could be implemented by a component or components of the CDMA network, such as a femtocell controller.

In other embodiments, the message received at block 502 may indicate both listed and unlisted channels. In such an embodiment, block 504 may involve the IWF comparing the channels identified in the message to the predetermined channel list (e.g., the list of channels a UE should scan during circuit switch fall back, which is included in a SIB8 message), and identifying which of the identified channel are unlisted. Alternatively, the received message could explicitly indicate which of detected channels are unlisted. In this case, the IWF could use this information to more quickly identify which of the detected service entities are operating on unlisted channels.

At block 506, the channel-update message that is sent by the first access network may take on various forms and include various types of information. For example, referring to FIG. 2, the IWF 212 in the LTE network 201 may send a channel-update message to the MSC in the CDMA network, which identifies a CDMA base station (e.g., a femtocell) that was detected by a UE and is operating on an unlisted channel (e.g., a carrier frequency that the LTE network has not included in SIB8 messages sent to the UE).

The channel-update message may identify the CDMA base station by including a base station ID or femtocell ID, for example, and/or by indicating the unlisted carrier frequency on which it is operating. Alternatively, the channel-update message may identify the detected serving entity or entities by identifying the unlisted channel, and possibly the PN offset, where CDMA service was detected by the UE (rather than identifying the serving entity with, e.g., a base station ID). As such, when the IWF provides this information to a CDMA network, the CDMA network can determine the serving base station based on the unlisted channel and PN offset that are indicated by the UE (and possibly the UE's location as well). In either case, the CDMA network, may provision an identified base station to operate on a listed channel, instead of on an unlisted channel. This may allow the UE to detect the identified base station, when it performs a scan of the predetermined channel list for CDMA service to take a voice call.

In a further aspect, it may be desirable for a base station to switch from an unlisted channel to a listed channel on a temporary basis, instead of doing so permanently. Accordingly, in some embodiments, the first access network may be further configured to provide some indication to the second access network as to when a base station that switched to a listed channel, should switch back to an unlisted channel (or when operation on the listed channel is no longer desired). To do so, the first access network may send a channel-restore message to the second access network.

In some cases, the first access network may send a channel-restore message to the second access network after some pre-determined amount of time has elapsed. In other cases, the first access network may send a channel-restore message to the second access network in response to some kind of trigger event. For instance, subsequent to receipt of the first message at block 502, an IWF may receive a second message from the same UE, which indicates one or more detected serving entities that were detected by the UE during a second scan for service under the second protocol. The IWF may determine that, during the subsequent scan, the UE did not detect a signal from the base station that was re-provisioned (or that the signal from the base station did not meet certain signal-strength criteria). For example, the IWF may determine determine that the second channel, on which the first base station was re-provisioned to operate in accordance with block 506, was either (a) not detected by the UE during the subsequent scan or (b) was detected during the subsequent scan, but fails to meet certain signal-strength criteria. In either case, the IWF may responsively send a channel-restore message to the CDMA network, which indicates to the CDMA network that the first base station does not need to continue operating on a listed channel.

C. Exemplary Functions of a Second Access Network

Figure 6:
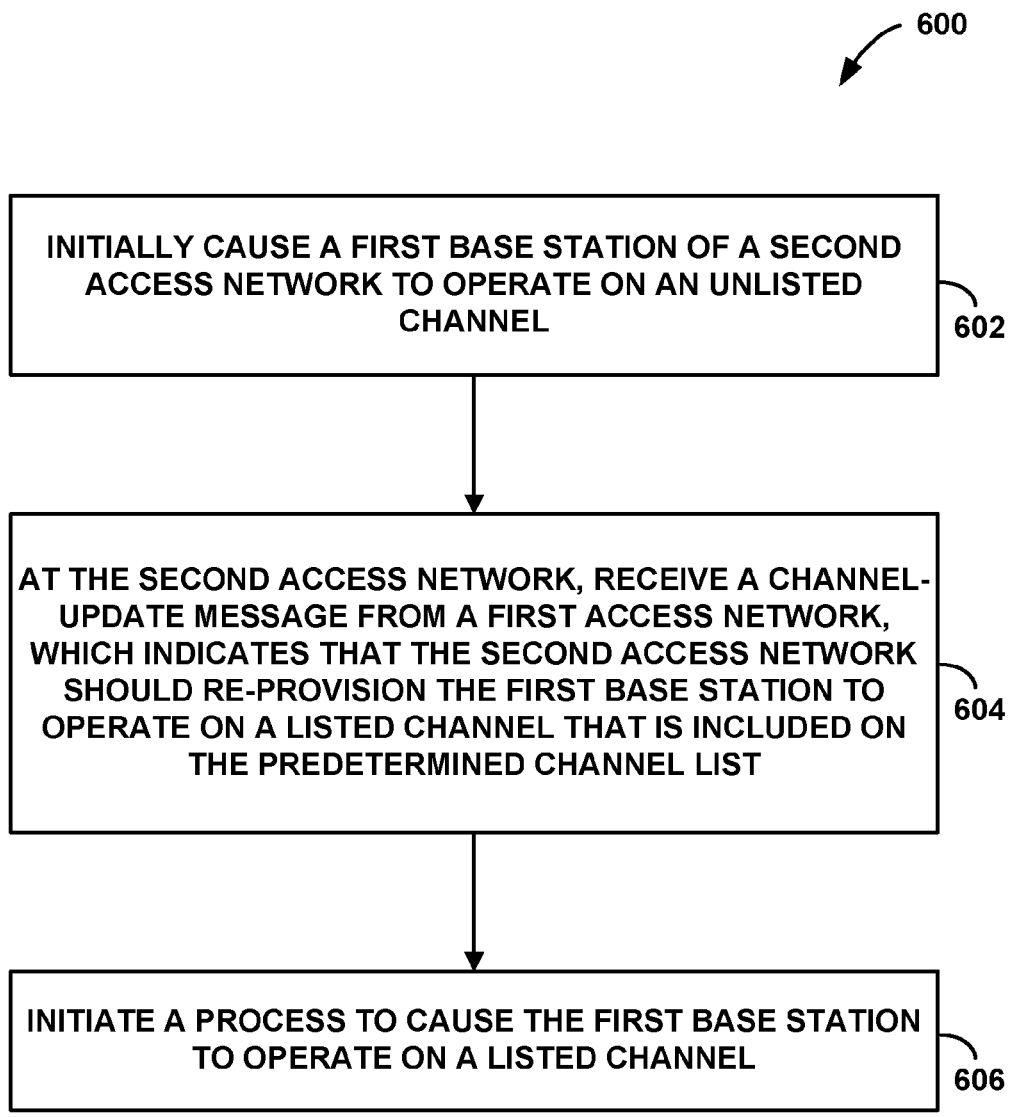
FIG. 6 is a flow chart illustrating another method, according to an exemplary embodiment.

FIG. 6 is a flow chart illustrating a network-implemented method 600, according to an exemplary embodiment. In particular, method 600 may be implemented by a second access network (e.g., by one or more components of the network) to help improve service when a transfer from a first network occurs (or in other words, when fall back to the second network occurs). For instance, method 600 may be implemented in a CDMA network to help improve service when a UE is transferred from an LTE network to the CDMA network for a voice call, according to a typical CSFB and/or eCSFB process. In some embodiments, where a CDMA network includes femtocells that typically operate on unlisted channels, method 600 may be implemented by a femtocell controller. However, method 600 may be implemented by other components or combinations of components in CDMA network, without departing from the scope of the invention.

As shown by block 602, method 600 involves a second access network initially causing a first base station of the second access network to operate on an unlisted channel, which is not included on a predetermined channel list. The second access network may then receive a channel-update message from a first access network, which indicates that the second access network should re-provision the first base station to operate on a listed channel that is included on the predetermined channel list, as shown by block 604. The second access network may responsively initiate a process to cause the first base station to operate on a listed channel, as shown by block 606.

In an exemplary embodiment, block 602 may involve an entity of a CDMA network, such as a BSC, MSC, or femtocell controller, assigning a channel (e.g., a carrier frequency) to a macro base station or femtocell, respectively, and provisioning the macro base station or femtocell to operate on the assigned channel. By design or by chance, the assigned channel may not be included on a predetermined channel list. Specifically, the assigned channel may not be included in a SIB8 message that is sent to a UE that is within range of the base station or femtocell, and indicates channels that should be scanned by the UE for CDMA service.

Further, block 604 may involve a BSC and/or an MSC of a CDMA network receiving a channel-update message, which may be sent by an LTE network according to block 506 of method 500. The channel-update message could take other forms, however.

Yet further, block 606 may involve an entity of a CDMA network, such as a BSC, MSC, or femtocell controller, provisioning the macro base station or femtocell to operate on an unlisted channel. For example, the macro base station or femtocell may be provisioned to operate on a channel that can be included in a SIB8 message that is sent to a UE operating within range of the macro base station or femtocell.

As noted above, it may be desirable for a base station to switch from an unlisted channel to a listed channel on a temporary basis, instead of doing so permanently. In some cases, the second access network could receive some indication from the first access network as to when a base station should switch back to an unlisted channel (or when operation on the listed channel is no longer desired or needed).

In other cases, the second access network could itself determine when a base station should switch back to an unlisted channel and/or when operation on a listed channel is no longer desired or needed. For instance, method 600 may further involve a CDMA network waiting for predetermined period of time after initiating the process to cause a macro base station or femtocell to operate on the listed channel, and then initiating a process to cause the macro base station or femtocell to switch back to operating on an unlisted channel. Alternatively, the CDMA network could wait for predetermined period of time, and then carry out a channel-assignment process for the base station or femtocell to select a channel for the base station or femtocell. The channel-assignment process may involve an MSC, BSC, and/or femtocell controller selecting a channel from one or more candidate channels, which include at least one unlisted channel.

IV. CONCLUSION

Exemplary embodiments of the present invention have been described above. While various embodiments have been described in reference to CSFB and eCSFB implementations where a UE operating in an LTE network falls back to a CDMA network, those skilled in the art will understand that the methods and systems described herein may also apply for circuit-switched fall back in networks operating under other wireless communication protocols, such as fall back to a GSM protocol, for instance. Further, those of ordinary skill in the art will appreciate that numerous changes may be made from the embodiments described above without deviating from the scope of the invention as defined by the claims.

We claim:

1. A computer-implemented method comprising:
  receiving, at a user entity (UE) that is configured to communicate with a first access network under a first protocol and to communicate with a second access network under a second protocol, a message from the first access network that indicates to scan one or more channels of the second access network that are identified in a predetermined channel list, wherein the UE is further configured for circuit-switched fallback (CSFB) from the first access network to the second access network;
  performing a scan to detect one or more channels that are available for communication under the second protocol, wherein at least a first channel that is available for communication under the second protocol is detected during the scan;
  determining, by the UE, that the first channel is an unlisted channel that is not included on the predetermined channel list; and
  responsive to determining that the first channel is unlisted, the UE sending, to the first access network, a message that identifies the first channel of the second access network and facilitates a channel-update message to re-provision a first base station that operates on the first channel to instead operate on a second channel that is included on the predetermined channel list.

2. The method of claim 1, wherein the first base station is a femtocell.

3. The method of claim 1, wherein the first protocol comprises a Long-Term Evolution (LTE) protocol, and wherein the second protocol comprises a Code Division Multiple Access (CDMA) protocol.

4. The method of claim 1, wherein performing the scan to detect one or more channels that are available for communication under the second protocol comprises scanning one or more unlisted channels that are not included on the predetermined channel list.

5. The method of claim 1, wherein the second access network has, in response to the message that identifies the first channel, provisioned the first base station to instead operate on a second channel that is included on the predetermined channel list, the method further comprising:
  subsequent to sending the message that identifies the first channel, the UE receiving a message that instructs the UE to scan one or more listed channels that are included on the predetermined channel list; and
  responsively performing a scan of the one or more listed channels, wherein the UE detects the second channel as part of the scan.

6. The method of claim 1, further comprising:
  periodically performing scans to detect channels that are available for communication under the second protocol; and
  each time an unlisted channel is detected during one of the scans, sending a message to the first access network that identifies the unlisted channel.

7. The method of claim 1, further comprising receiving, from the first access network, a system information message that indicates system information for the second access network, wherein the system information message provides the UE with the predetermined channel list.

8. The method of claim 7, wherein the system information message comprises a system information block 8 (SIB8) message.

9. The method of claim 1, wherein the predetermined channel list comprises one or more channels for circuit-switched fallback (CSFB) service under the second protocol.

10. A computer-implemented method comprising:
  at a first access network that is configured for communications under a first protocol, receiving a first message that indicates one or more detected channels that were detected by a user entity (UE) during a scan for service under a second protocol, wherein each detected channel is available to the UE for communication with a second access network under the second protocol, and wherein the first access network is operable to provide the UE with circuit-switched fallback (CSFB) service from the first access network to the second access network;
  determining that at least a first detected channel is an unlisted channel that is not included on a predetermined channel list; and
  responsively sending a channel-update message to the second access network, wherein the channel-update message indicates to the second access network to re-provision a first base station that operates on the first detected channel to instead operate on a second channel that is included on the predetermined channel list.

11. The method of claim 10, further comprising:
  sending a message that indicates to the UE to perform a scan one or more listed channels that are included on the predetermined channel list; and
  receiving a second message that is associated with the UE, wherein the second message indicates that, during the scan, the UE detected the listed channel on which the first base station was re-provisioned to operate.

12. The method of claim 10, further comprising:
  receiving a second message that indicates one or more channels that were detected by the UE during a subsequent scan for service under the second protocol;
  determining that the second channel, on which the first base station was re-provisioned to operate, was either (a) not detected by the UE during the subsequent scan or (b) was detected but does not meet certain signal-strength criteria; and responsively sending a channel-restore message to the second access network, wherein the channel-restore message indicates to the second access network that the second access network need not cause the first serving entity to operate on a listed channel.

13. The method of claim 10, wherein first protocol comprises an LTE protocol, and wherein the second protocol comprises a CDMA protocol.

14. The method of claim 10, wherein the second access network is a CDMA network, and wherein the first base station in the second access network is a femtocell.

15. The method of claim 10, wherein the channel update message comprises a temporary channel update message.

16. A computer-implemented method comprising:

a second access network initially causing a first base station of the second access network to operate on a first channel, wherein the second access network provides service under a second protocol, and wherein the first channel is an unlisted channel that is not included on a predetermined channel list, and wherein the first channel is identified as an unlisted channel by a user entity (UE) after detecting the first channel during a scan to detect one or more channels that are available for communication under the second protocol, and wherein the first access network is operable to provide the UE with circuit-switched fallback (CSFB) service from the first access network to the second access network;

the second access network receiving a channel-update message from a first access network, wherein the channel-update message indicates that the second access network should re-provision the first base station to operate on a listed channel that is included on the predetermined channel list; and responsively initiating a process to cause the first base station to operate on a listed channel that is included on the predetermined channel list.

17. The method of claim 16, further comprising, after initiating the re-provision the first base station to operate on the listed channel, waiting for predetermined period of time, and then initiating a process to re-provision the first base station to again operate on an unlisted channel.

18. The method of claim 16, wherein first protocol comprises an LTE protocol, and wherein the second protocol comprises a CDMA protocol.

19. The method of claim 16, wherein the first base station is a femtocell, and wherein the method is performed by a femtocell controller.

20. The method of claim 16, wherein the channel update message comprises a temporary channel update message.

* * * * *